(12) United States Patent
Hoogland

(10) Patent No.: US 7,740,471 B2
(45) Date of Patent: Jun. 22, 2010

(54) MOLD HAVING INDEPENDENT MOVABLE WALLS

(75) Inventor: Hendricus Antonius Hoogland, Wormer (NL)

(73) Assignee: ECIM Technologies, B.V., LC Capelle A/D Ijssel (NL)

( * ) Notice: Subject to any disclaimer, the term of this patent is extended or adjusted under 35 U.S.C. 154(b) by 158 days.

(21) Appl. No.: 11/794,461

(22) PCT Filed: Dec. 23, 2005

(86) PCT No.: PCT/NL2005/000890

§ 371 (c)(1),
(2), (4) Date: Jun. 28, 2007

(87) PCT Pub. No.: WO2006/071113

PCT Pub. Date: Jul. 6, 2006

(65) Prior Publication Data

US 2008/0079197 A1    Apr. 3, 2008

(30) Foreign Application Priority Data

Dec. 28, 2004    (NL) .................................. 1027910

(51) Int. Cl.
*B29C 45/68* (2006.01)

(52) U.S. Cl. .................. 425/441; 425/442; 425/443; 425/450.1

(58) Field of Classification Search .................. 425/577, 425/438, 441, 442, 443, 450.1
See application file for complete search history.

(56) References Cited

U.S. PATENT DOCUMENTS

| | | | |
|---|---|---|---|
| 4,025,022 A | 5/1977 | Theysohn et al. | |
| 4,969,811 A * | 11/1990 | Littleton | 425/577 |
| 5,945,045 A | 8/1999 | Parker | |
| 6,527,540 B1 | 3/2003 | Dantlgraber | |
| 7,470,121 B2 * | 12/2008 | Ness et al. | 425/441 |

* cited by examiner

*Primary Examiner*—Tim Heitbrink
(74) *Attorney, Agent, or Firm*—Hoffmann & Baron, LLP

(57) ABSTRACT

A method for manufacturing products using a mold having at least one mold cavity which is at least partly defined by at least two movable wall parts, wherein the mold is closed and the at least two movable wall parts (35A, 35B) are brought to a retracted position relative to the mold cavity, so that the volume of the mold cavity is enlarged relative to the volume required for a product to be formed, wherein at least partly molten material is introduced into the mold cavity and then in a first step a first one (35A) of the at least two movable wall parts is set into motion in the direction of a forwardly moved position and in a second step a second one (35B) of the at least two movable wall parts is set into motion in the direction of a forwardly moved position, wherein the movable wall parts are moved into said forwardly moved position for the formation of the product.

6 Claims, 9 Drawing Sheets

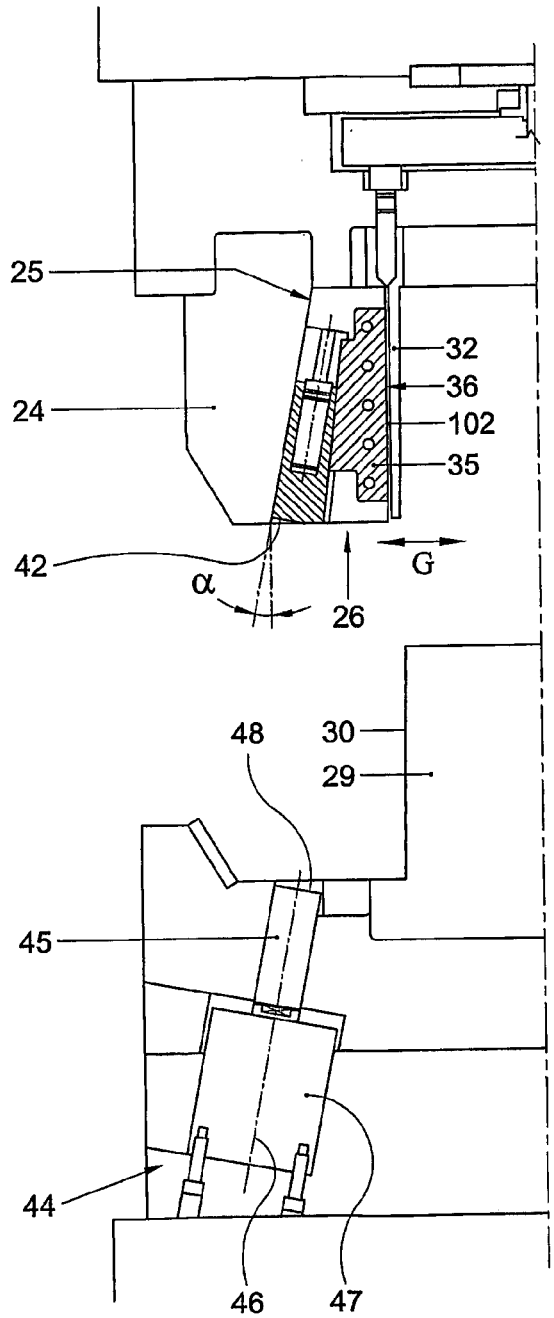
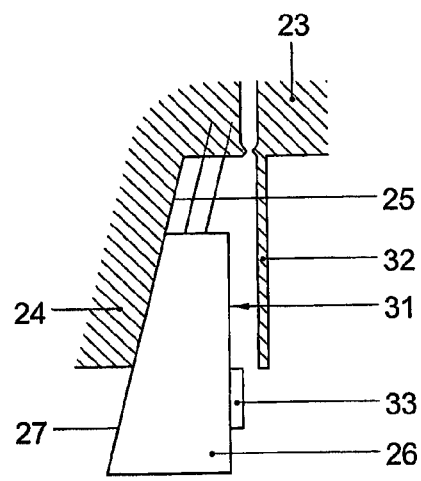
Fig. 4A
Fig. 4

MOLD HAVING INDEPENDENT MOVABLE WALLS

This application is the U.S. National Phase of, and Applicant claims priority from, International Application Number PCT/NL2005/000890 filed 23 Dec. 2005 and Netherlands Patent Application bearing Serial No. 1027910 filed 28 Dec. 2004, which are incorporated herein by reference.

BACKGROUND OF THE INVENTION

The invention relates to a method for manufacturing products. The invention relates in particular to a method for manufacturing products using a mold.

Mold-forming products provides the advantage that products can be manufactured relatively simply and reproducibly. Use can then be made, for instance, of injection molding technique. A disadvantage of this is that relatively high injection pressures are necessary to make the material spread throughout the mold cavity. Moreover, the injection temperature should be relatively high in order to prevent the material solidifying before the whole mold cavity has been filled. As a consequence, particularly high closing forces need to be applied to the mold, and stresses develop in the material and the product to be molded, which lead to an undesirably high degree of inaccuracy.

It has previously been proposed to make use of movable wall parts in the mold, so that flow paths for the material can be enlarged in cross section at least locally. As a consequence, the injection pressure can be lowered, as well as the injection temperature. In this technique, however, the control of the movable wall parts has to date been difficult.

An object of the invention is to provide a method for forming products using a mold with movable wall parts. In particular, an object of the invention is to provide a method for injection molding products, in which wall parts can be moved accurately and reproducibly.

SUMMARY OF THE INVENTION

In a first aspect, a method according to the invention is characterized in that the sequence of movement of the different movable wall parts is predetermined and is controlled, with the movable wall parts being moved in different steps. The steps have been chosen such that the movable wall parts are not set into motion all at the same time. Surprisingly, it has been found that in this way available energy for moving the wall parts can be utilized in a more accurate and more advantageous manner. Thus, it is possible to work more accurately.

In a second aspect, a method according to the invention is characterized in that different movable wall parts are set into motion at different times for displacing material, in particular plastic, in the mold cavity, such that the material is kept moving. It may then be advantageous that at least in a first step a movable wall part near a point where the material is introduced into the mold cavity is set into motion first and only then the or each further movable wall part.

In a further aspect, the invention is characterized in that a bottom-forming part and a wall-forming part are used, while in the bottom-forming part at least one movable wall part is provided and in the wall-forming part at least two movable wall parts are provided, and of the movable wall parts arranged in the wall-forming part, a movable wall part having the smallest surface is set into motion before the other movable wall part is set into motion. In that way, the available energy is used in a particularly advantageous manner.

In a still further aspect, the invention is characterized in that at least one and preferably each of the movable wall parts is moved from a retracted position to a forwardly moved position so fast that adiabatic heat development occurs in material in the mold cavity, so that the viscosity of the material is reduced. Preferably, the temperature in the material is raised, in particular such that the temperature is brought and/or held above the melting temperature of the material, at least until the respective movable wall part has been brought into the forwardly moved position.

In another aspect, the invention concerns a mold, provided with movable wall parts and a control unit therefor, with which the movable wall parts can be moved sequentially. Such a mold is particularly suitable for practicing a method according to the invention. With such a mold, products can be formed in a particularly simple and well-reproducible, accurate manner.

In yet another aspect, the invention concerns an operating device for a mold for forming products. This operating device comprises hydraulic and/or pneumatic means with a piston-cylinder assembly for different movable wall parts, as well as a pressure device for the supply and discharge of a pressure fluid under pressure to and from the piston-cylinder assemblies. Further provided is a control unit which is arranged such that the pressure fluid can be placed under high pressure, with pistons of one or more of the piston-cylinder assemblies being stationary, after which, using the built-up pressure, the or each respective piston can be set into motion instantaneously. In that way, the available energy is utilized in a particularly advantageous, accurate manner.

BRIEF DESCRIPTION OF THE DRAWINGS

In illustration and further elaboration of the invention, exemplary embodiments thereof will be further elucidated with reference to the drawing, in which:

DETAILED DESCRIPTION OF THE INVENTION

Figure 1:
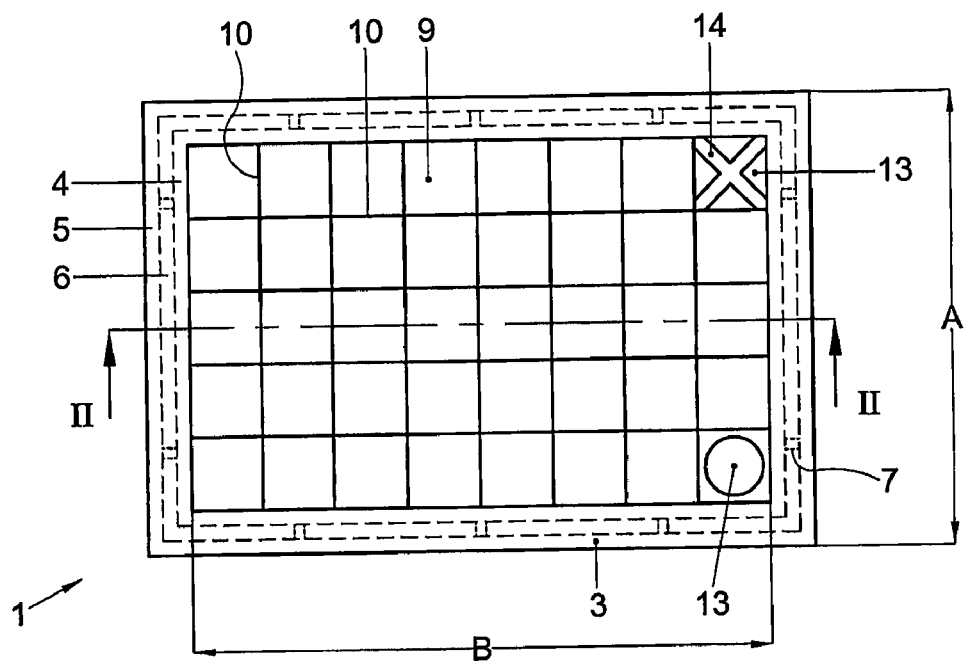
Figure 2:
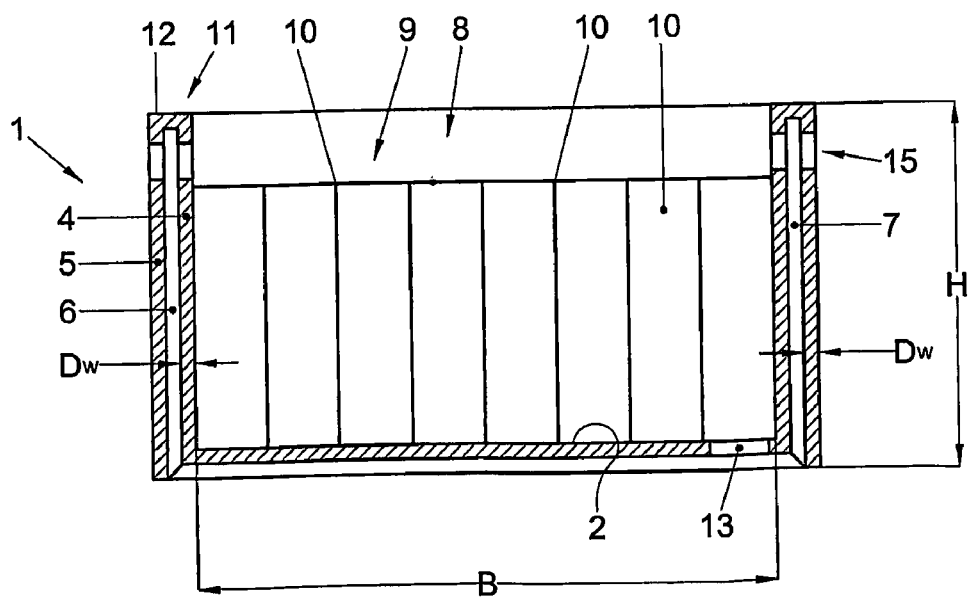
Figure 3A:
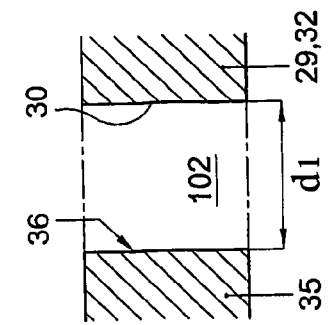
Figure 3B:
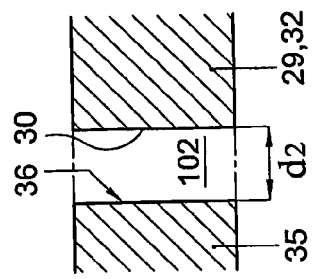
Figure 3:
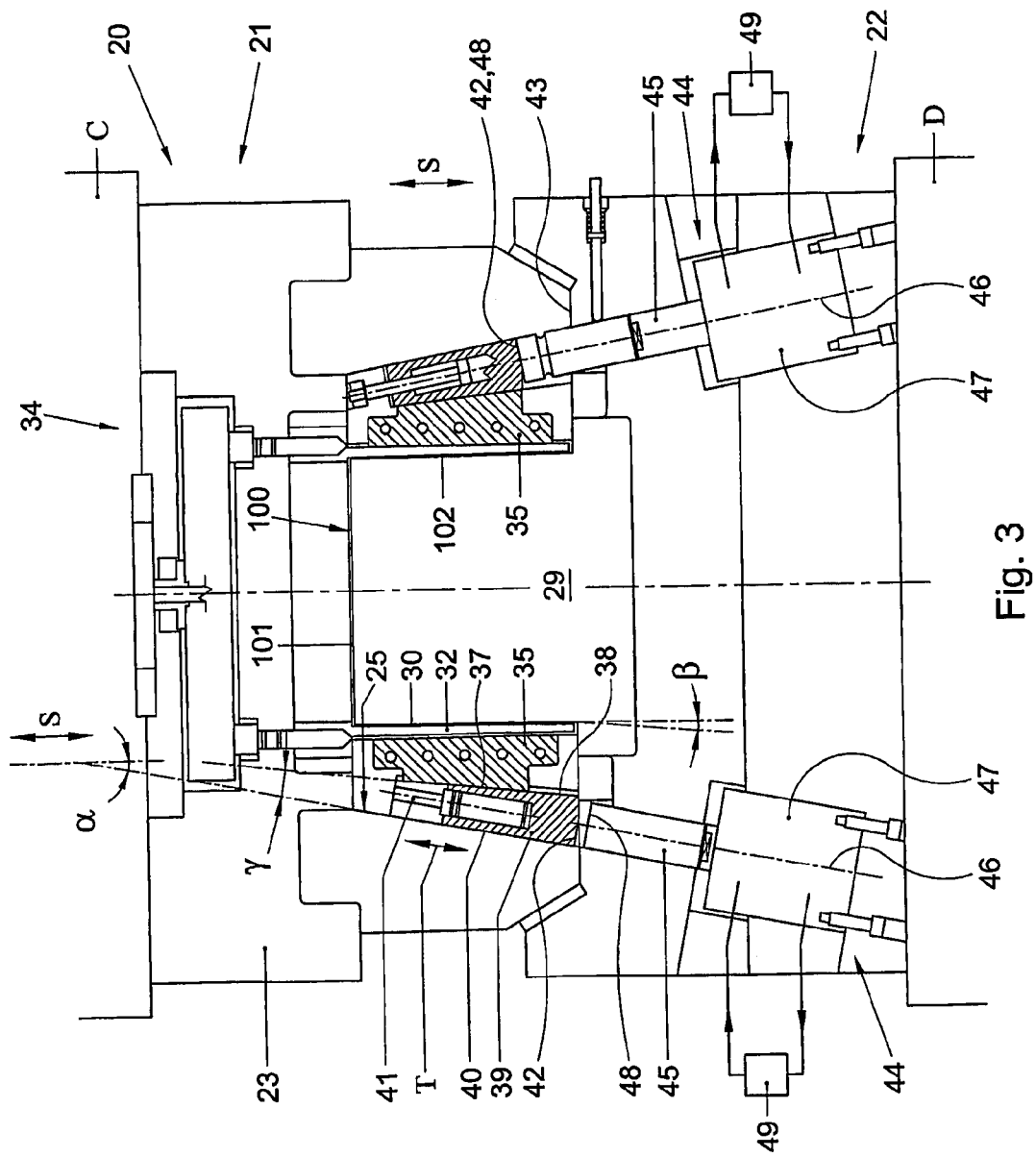
Figure 5:
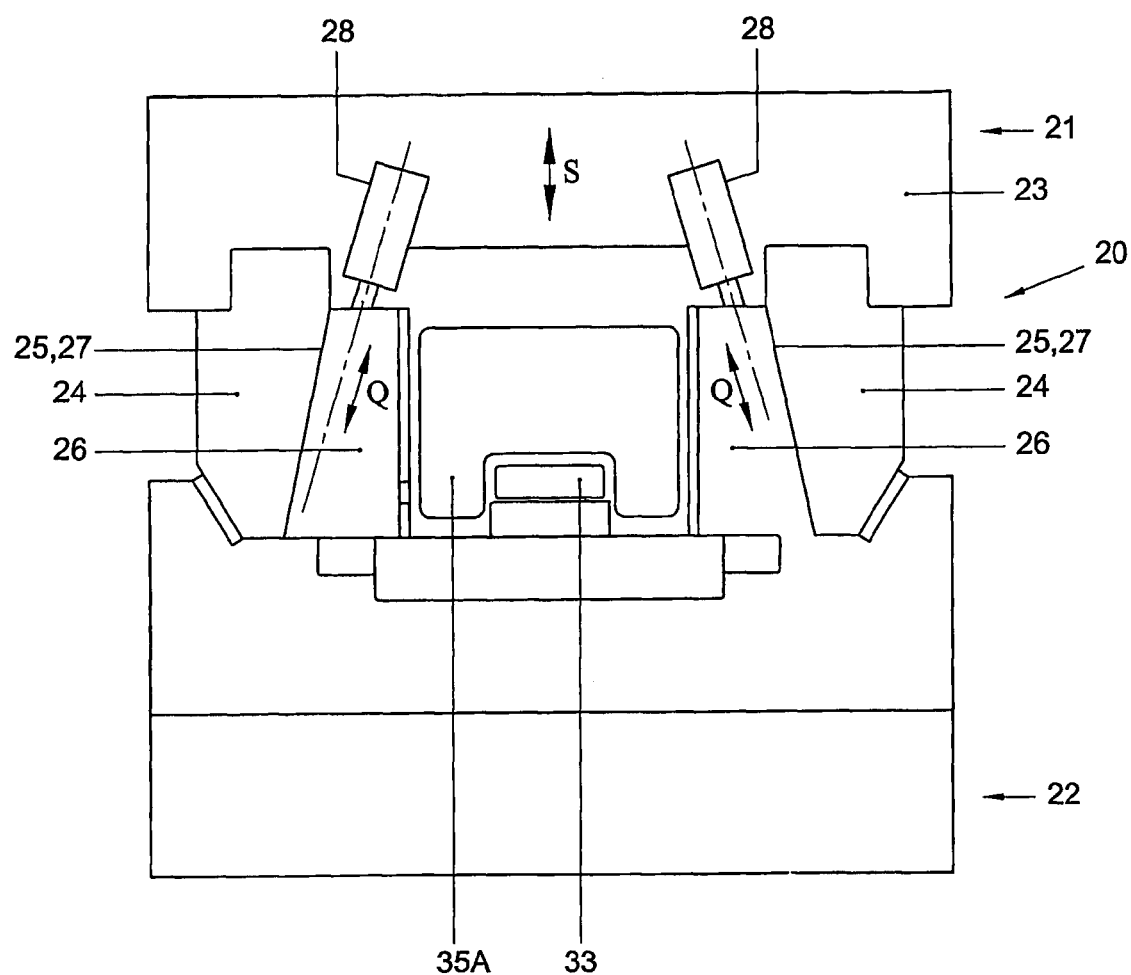
Figure 6:
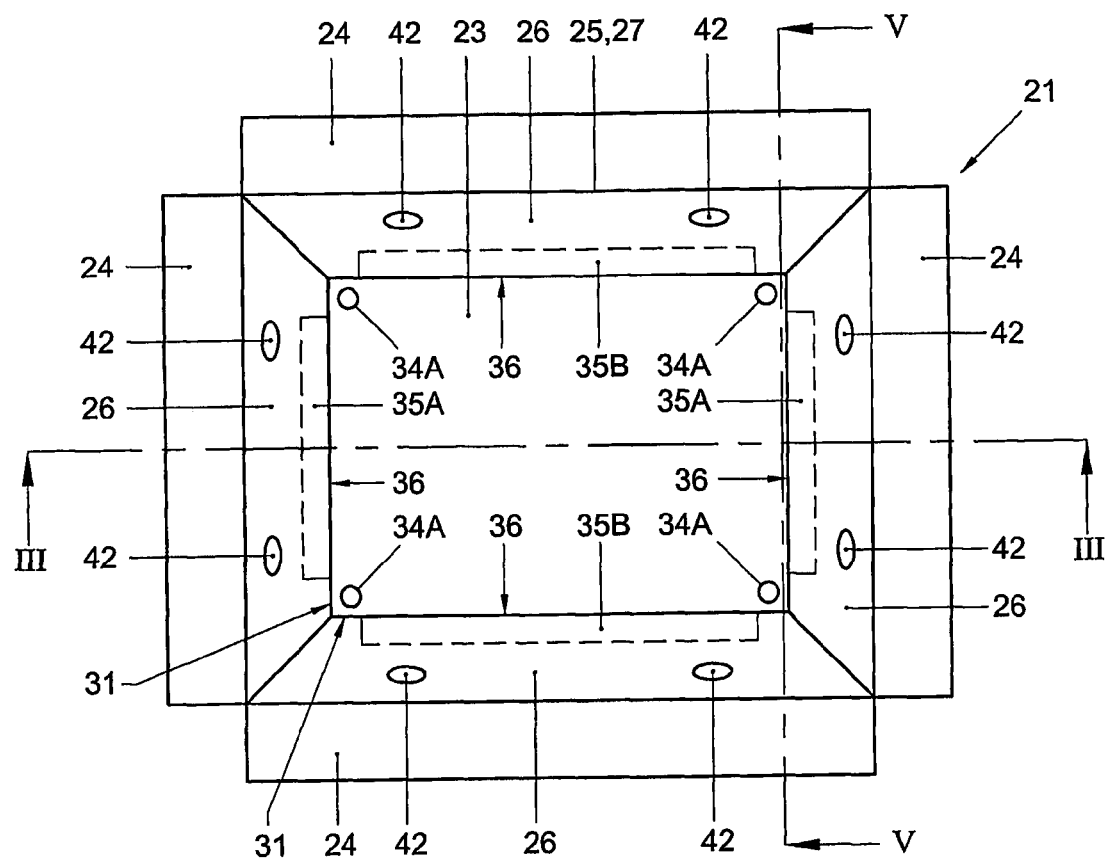
Figure 7:
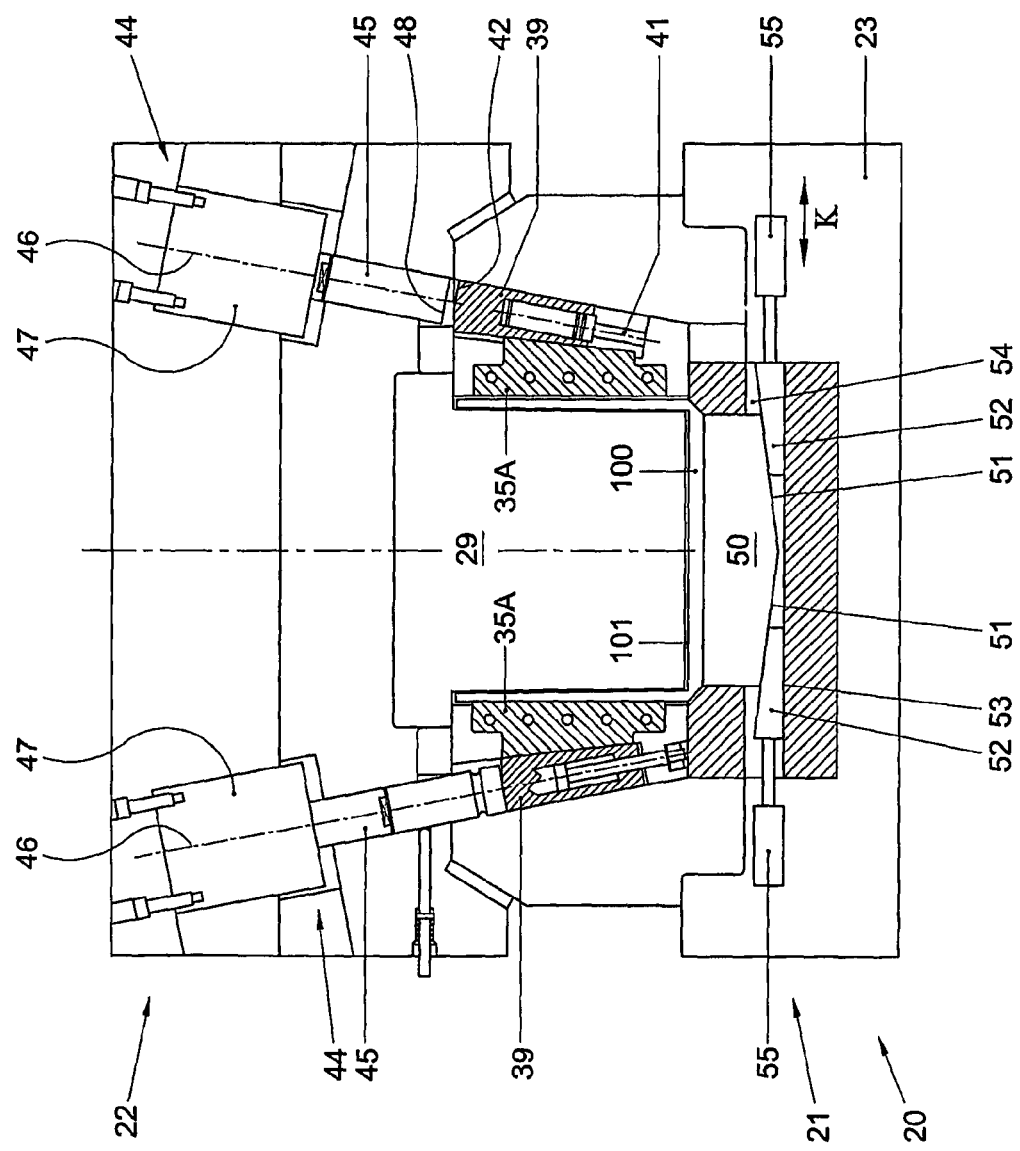
Figure 8:
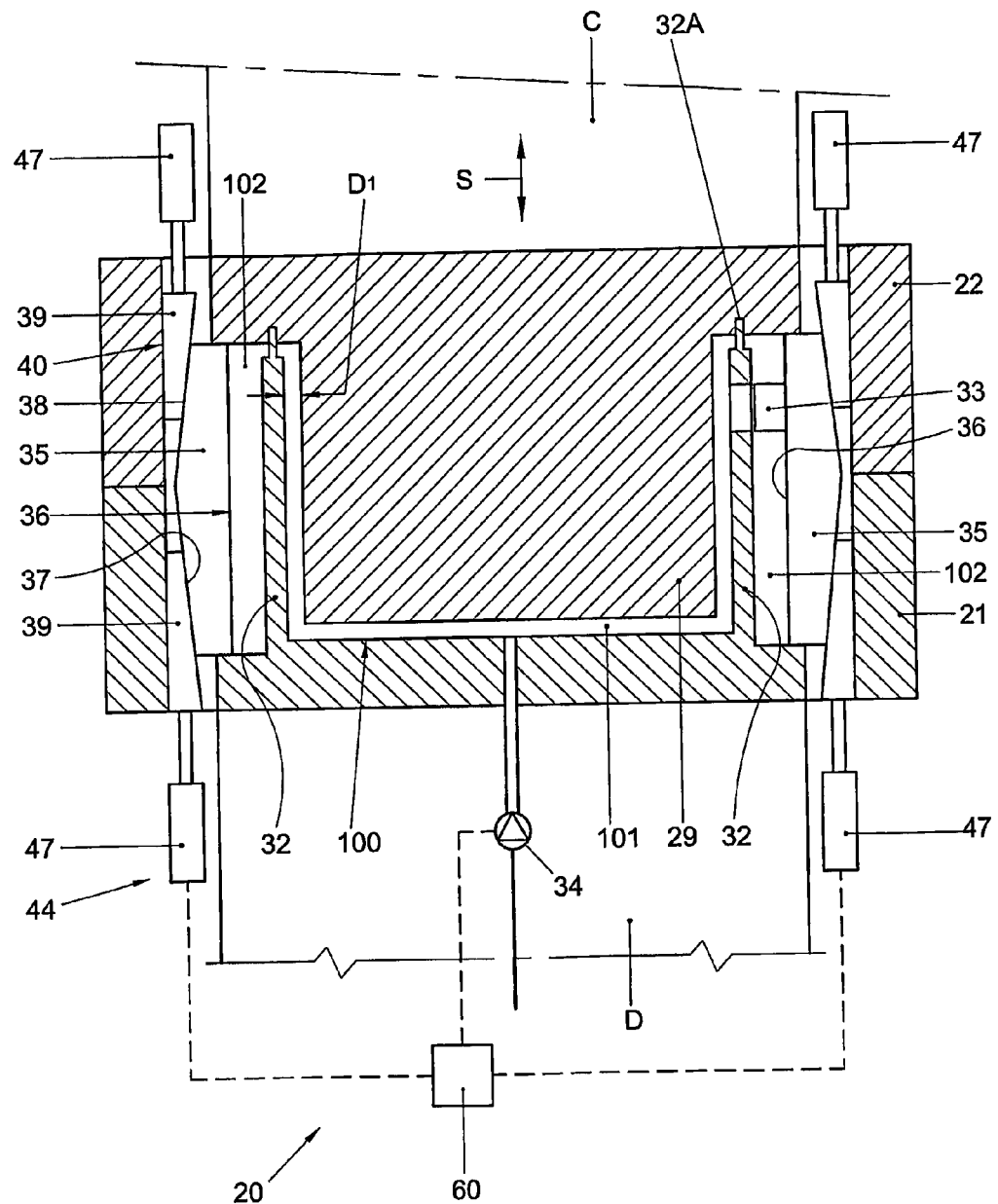
Figure 9:
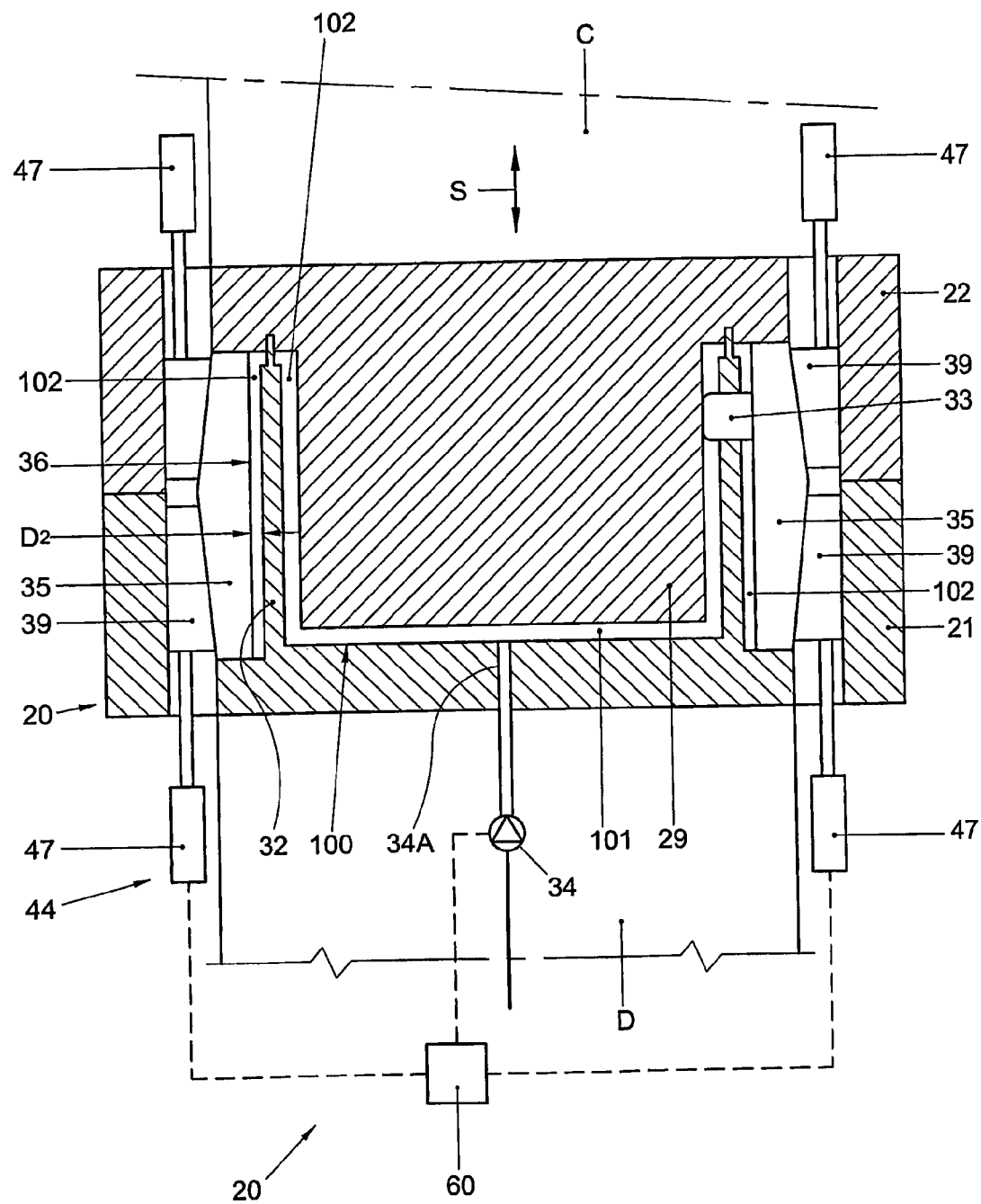
Figure 10:
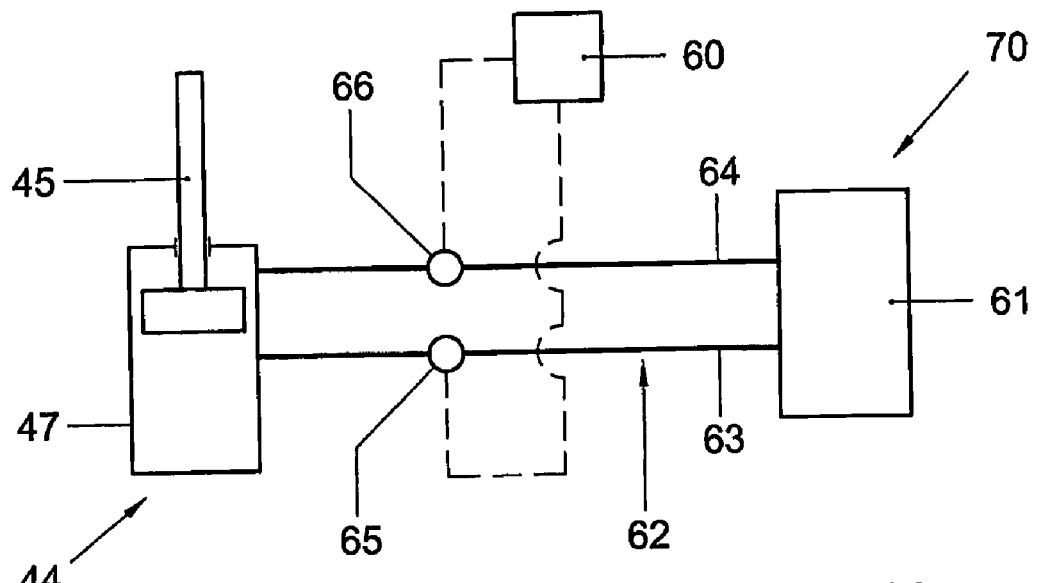
Figure 11:
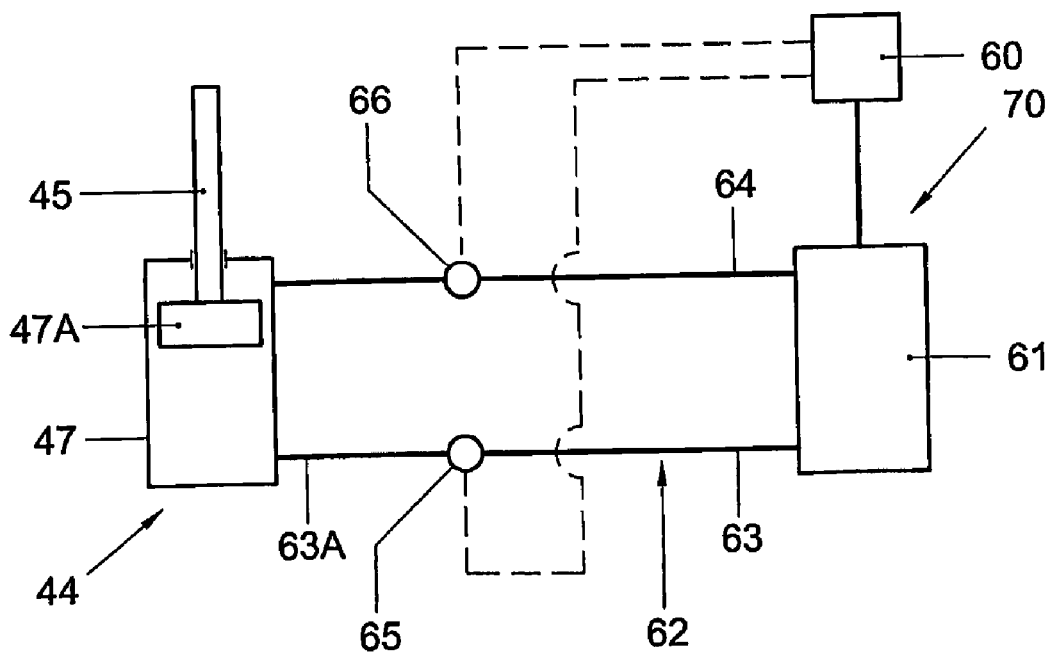

FIGS. 1 and 2 show a product in top plan view and partly sectional side elevation;

FIG. 3 shows, in partly cross-sectional side view along the line III-III in FIG. 6, a mold according to the invention, in closed condition, with on the left in the drawing a second movable wall part in a retracted position and on the right in a forwardly moved position;

FIG. 4 shows in a partly cross-sectional side view according to FIG. 3 the left-hand half of the mold in open condition, with the first movable wall parts in a forwardly moved position and the second movable wall parts in a retracted position;

FIGS. 3A and B show on an enlarged scale the distance between the second movable wall part and an adjacent core (part), with the second movable wall part in the retracted position and in the forwardly moved position, respectively;

FIG. 4A shows a portion of a fixed wall part with a first movable wall part moved away;

FIG. 5 shows in sectional front view along the line V-V in FIG. 6 a mold according to the invention, in closed condition;

FIG. 6 shows a first mold part according to the invention, in an elevation seen from the second mold part;

FIG. 7 shows, in a similar elevation to FIG. 3, a mold according to the invention, in an alternative embodiment with a further movable wall part in a bottom-forming part;

FIGS. 8 and 9 show in sectional side elevation an alternative embodiment of a mold according to the invention;

FIG. 10 schematically shows a control unit for operation of a piston-cylinder assembly according to the invention, in a first embodiment; and FIG. 11 schematically shows a control unit for operation of a piston-cylinder assembly according to the invention, in a second embodiment.

In this description, identical or corresponding parts have identical or corresponding reference numerals. Combinations of parts of the embodiments shown are understood to be represented herein as well. In this description, as an example, a crate, in particular a crate for bottles, will be described. However, the invention should not in any way be taken as being limited thereto. Many other holders, with or without compartmentation, having bottom surfaces of a variety of different shapes such as circular, rectangular, square, or any other shape, are possible within the framework of the invention. Also, holders can be formed with and without cavities in the sidewalls and/or bottom. Further, also other products can be manufactured in the same or a comparable manner, for instance partly hollow plate-shaped, bar-shaped, tubular or differently shaped products. The products can have a longitudinal wall or longitudinal walls extending at right angles to a bottom surface, but the or a longitudinal wall thereof can also be inclined relative to the bottom surface.

In a mold and method according to the invention, different materials, in particular different plastics, can be used, in particular thermoplastic plastics and blends. Also crystalline plastics and mixtures thereof have particularly good utility within the invention.

FIG. 1 shows, in top plan view, a holder 1 according to the invention, in the form of a bottle crate, to which the invention is not limited. FIG. 2 shows the holder 1 in cross-sectional side view. This holder 1 comprises a bottom surface 2 and a longitudinal wall 3 extending therefrom. The longitudinal wall 3 is substantially double-walled, which means that it comprises a first wall 4, a second wall 5 and, located therebetween, a cavity or open space 6. The wall thickness Dw is relatively small with respect to the dimensions A, B of the bottom surface 2 and the height H. The wall thickness can be, for instance, between some tenths of millimeters and some millimeters, depending on, for instance, the holder dimensions, intended use and the like. Between the walls 4, 5 cross partitions 7 can be provided, preferably having a comparable wall thickness, for stiffening and increasing the bearing capacity. Within the longitudinal wall 3 and the bottom surface 2, in an inner space 8, a compartmentation 9 is provided by cross walls 10. These reach to a point under the upper side 11 of the longitudinal wall 3. The upper ends of the walls 4, 5 are interconnected by a carrier edge 12, preferably having a wall thickness comparable to that of the walls 4, 5. In the bottom surface 2, openings 13 can be provided, being for instance circular, as shown at the bottom, right, or formed by cross bars 14, as shown at the top, right. By providing openings, material and weight, cooling time and/or closing pressure can be limited. In the longitudinal wall 3 handles 16 are provided at opposite sides.

Hereinafter, a mold 20 and method will be described which can be used for a holder 1 according to the invention. It will be clear, however, that also a variety of other products can be manufactured with a comparable mold, for instance containers of a different kind, especially also single-walled holders.

FIGS. 3 and 4 show a mold 20 in a closed and open condition, respectively. The mold 20 comprises a first part 21 and a second part 22, which can move relative to each other in an opening and closing direction, indicated by the arrow S. To that end, for instance the first part 21 is included on a fixed table C and a second part 22 on a movable table D of a press (not shown) or like injection molding apparatus known per se. Incidentally, a variety of other means can also be used for opening and closing the mold 20. The mold 20 comprises a mold cavity 100 with a first part 101, being a bottom-forming part in the exemplary embodiment shown, and a second part 102, being a wall-forming part in the embodiment shown.

FIG. 6 schematically shows an elevation of the first part 21, viewed in the direction S from the (removed) second part 22. The first part 21 comprises a bottom plate 23 having thereon four fixed wall parts 24 upstanding from the bottom plate 23, extending along the sides of a rectangle. The fixed wall parts 24 are provided, on the sides facing each other, with a first guide surface 25 which includes an angle $\alpha$ with the direction S. On each fixed wall part 24, a movable wall part 26 is carried, of which a second guide surface 27 abuts against the first guide surface 25 and includes a same angle $\alpha$ with the direction S. First operating means 28, as schematically drawn in as a piston-cylinder assembly in FIG. 5, are included in the first mold part 21 for moving the movable wall part 26 along the first guide surface 25 in a second direction Q, parallel to angle $\alpha$.

As appears clearly from FIGS. 3-6, the second mold part 22 is provided with a core part 29 which, with mold 20 closed, can be moved between the movable wall parts 26, for forming for instance the inner space 8, the partitions 7 and the like. In the drawing, for simplification, the core part 29 is drawn as a block, with sides having a draft angle $\beta$. As appears from FIG. 3, with the mold closed, between the sides 30 of the core part 29 and the wall surface 31 of each movable wall part 26 that faces the core part 29, a thin core 32 is included, mounted on the bottom plate 23, for forming the cavity 6 in the walls of the holder 1. These cores 32 can be omitted if for instance a holder 1 with solid walls is manufactured. As appears from FIG. 4A, on the wall surface 31 a projection 33 may be provided which, with the mold closed, reaches into or through the core 32, for instance as far as against the core part 29, and can form a handle 15 or other opening or a deepened portion in the respective side of the holder 1.

The mold 20 is provided, in the bottom plate 23, with injection means 34, at least injection openings 34A, through which during use plastic or other material can be introduced into the mold 20, for forming a product such as holder 1 shown. In the exemplary embodiment shown, the openings 34A are provided near corners of the cores 32.

In each of the movable parts 26, in the wall surface 31 a first or second movable wall part 35A, B is arranged, which is movable between a retracted position, as shown in FIG. 3 on the left-hand side, and a forwardly moved position, as shown in FIG. 3 on the right-hand side. To that end, these first or second movable wall parts 35A, B can move in a direction G which, for instance, are all approximately at right angles to the opening and closing direction S. Each first or second movable wall part 35A, B has a wall-forming part 36 on the side facing the core part 29. On the opposite side, each movable wall part 35A, B is provided with a first operating surface 37. Seen from the core part 29, behind each first or second movable wall part 35A, B, against the first operating surface 37, a second operating surface 38 has been laid which forms part of a slide 39 which is movable along the first operating surface 37, in a third direction T. Each slide 39 has its opposite countersurface 40 supported against the first guide surface 25 and can move along it. Each slide 39 is slightly wedge-shaped, in the sense that the countersurface 40 and the second operating surface 38 slant towards each other in the direction of the bottom plate 23. The first operating surface 37 includes an angle $\gamma$ with the first guide surface 25, which approximately corresponds to the wedge angle $\gamma$ of the slide 39. This means that if the slide 39 is moved in the third direction T towards the bottom plate 23, the respective first or second movable wall part 35A, B is pushed away from the first guide surface 25. Since this first or second movable wall part 35A, B is guided by the movable wall part 26 so as to be movable only in the fourth direction mentioned, it is forced in the direction of the core 32 and the core part 29.

As appears clearly from FIG. 6, the first movable wall parts 35A are provided in the wall-forming parts arranged for forming the end walls 4, 5 of the holder 1, while the second movable wall parts 35B are provided in the wall-forming parts arranged for forming the sidewalls 3 of the holder 1. In the exemplary embodiment shown, the end walls have a smaller surface than the sidewalls.

For obtaining proper guidance, each slide 39 is slidable over or along a guide rod 41 which extends through the first movable wall part 26 in the direction T.

On the side remote from the bottom plate 23, an end 42 of the slide 39 is situated in or near a partial surface 43 of the mold. In FIG. 6 an embodiment is shown where for each first or second movable wall part 35A, B two slides 39 are provided, whose ends 42 have been drawn in as ovals.

In the second mold part 22, for each slide 39 an operating means 44 is provided, comprising a piston-cylinder assembly 47 with a piston rod 45 having a longitudinal axis 46 extending parallel to the third direction T. The piston rod can move in the direction of the longitudinal axis, and hence in the third direction T, driven by the piston-cylinder assembly 47, for instance hydraulically, pneumatically or electrically. Of course, all kinds of other means, known per se, can be provided for driving the piston rod 45 in the third direction T. The piston rod 45 has a forward end 48 which, with mold 20 closed, can abut against the end 42 of the slide 39, for moving same. As is clearly apparent, the piston rod 45 is not fixedly connected with the slide, so that the mold can be simply opened and closed.

In the exemplary embodiment shown, the piston-cylinder assembly 47 is driven by hydraulic means, schematically represented by the rectangle 70. Such means will be immediately clear to those skilled in the art. A control unit 60 is provided for operating the different hydraulic means 44, as will be discussed in more detail hereinafter.

A mold 20 according to FIGS. 3-6 can be used as follows.

The mold 20 is closed, as shown in FIG. 3, with the movable wall parts 26 in a forward position, in contact with the bottom plate 23, and the first and second movable wall parts 35A, B in the retracted position, as shown on the left-hand side. The piston rods 45 are in a retracted position, with the ends 42, 48 just butting against each other or at a slight distance. In this condition, plastic is introduced into the mold cavity via the openings 34A, near the transition between the first and second part 101, 102 of the mold cavity 100. The plastic will largely fill the two parts 101, 102, though not completely so since the volume of plastic that is introduced into the mold cavity is virtually equal to the volume of the desired end product, whereas the volume of the mold cavity is greater as a result of the retracted first and/or second movable wall parts 35A, B. After at least the greater part and preferably all of the plastic has been introduced into the mold cavity, the piston-cylinder assemblies 47 are energized, so that the piston rod is moved forcefully in the direction of the bottom plate 23, in the direction T. It will thereby carry along the slide 39 abutting against it, so that the respective first or second movable wall part 35A, B is moved in the fourth direction, to the forwardly moved position, as shown in FIG. 3 on the right-hand side. Plastic between the respective second movable wall part and the opposite part of the core 32 or core part 29 will be displaced and the entire mold cavity is filled with the plastic. With all first and second movable wall parts 35A, B in the forwardly moved position, the volume of the mold cavity 100 is substantially equal to that of the plastic introduced, while optionally after-pressure can be applied for compensation of shrinkage. In this condition the mold cavity moreover has the shape of the desired product.

Using the control apparatus 60, the movement of the first and second movable wall parts 35A, B is accurately driven. In a first step, each of the first movable wall parts 35A is set into motion and only then, in a second step, each of the second movable wall parts 35B. In this way, the plastic can be spread through the mold cavity 100 still better and optimum use is made of the available hydraulic energy. Preferably, the second step starts before the first movable wall parts 35A have reached the forwardly moved position.

After in this condition the plastic has been allowed to solidify for some time, the mold 20 is opened for removal of the product 1. To that end, the piston rods 45 are retracted substantially into the second part 22 of the mold 20, as shown in FIG. 3 on the left-hand side. Next, the second part 22 is moved away from the first part 21, preferably simultaneously, or at least synchronized, with the movement of the movable wall parts 26 to a rearward position shown in FIG. 4A. In that position, the projections 33 have been pulled away, and the product 1 (not shown in FIGS. 4 and 4A) can be taken from the first mold part 21. Next, the mold 20 can be closed again for a next cycle.

It is preferred that the second movable wall parts are moved to the forwardly moved position at high speed, preferably so fast that adiabatic heat development occurs at least in a part of the displaced plastic. It is advantageous in particular when the temperature in the displaced plastic and/or plastic to be displaced thereby obtains and/or keeps a temperature above the melting temperature of the respective plastic, so that the viscosity is reduced. The speed will then have to be chosen depending on for instance the plastic used, the desired wall thickness of the product at the respective positions, the total dimensions of the product, flow path lengths and cross sections, moving distance of the second movable wall parts. The suitable speed can be simply determined, for instance through experimentation with different speeds. As a consequence, the injection pressure of the plastic can be relatively low, and so can the closing pressure for keeping the mold closed. As a result, the properties of the plastic are not adversely affected and relatively stress-free products can be formed with particularly thin wall thicknesses and/or different wall thicknesses, and moreover relatively short cycle times are achieved. Moreover, as a result of the relatively low pressures, the advantage is achieved that relatively little material needs to be used for the mold, and cores, inserts and the like, if applicable, can be made of light and thin design. In this way, the freedom of design is enlarged still further.

In the embodiments shown, the angle $\alpha$ is for instance in the order of magnitude of between 5 and 30 degrees, more particularly approximately 15 to 20 degrees and the angle $\beta$ between the closing direction S and the wall 30 is particularly small, in particular less than 5 degrees, for instance 1 to 2 degrees. The angle $\gamma$ in the exemplary embodiment shown is smaller than the angle $\alpha$ and is between 1 and 10 degrees. This angle is for instance 2 to 6 degrees. These angles can in each case be chosen in a suitable manner on the basis of the desired speed of movement of the slide 39 and the second movable wall part 35, the force required therefor and the distances to be traveled.

In FIG. 7 an alternative embodiment of a mold 20 according to the invention is shown, which is broadly identical in structure to that according to FIGS. 3-6. These parts will not be further described here. In this embodiment, in the bottom-forming part, a third movable wall part 50 is provided. This wall part 50, on its side remote from the mold cavity 100, has two surfaces 51 sloping towards the middle. From two opposite sides, wedge-shaped slides 52 extend under the surfaces 51, which wedges 52 rest on a bottom 53 of a slot 54. Each slide 52 is drivable along the bottom 53 by means of a piston-cylinder assembly 55 or other earlier-discussed driving mechanism, in a direction K. In FIG. 7, the wall part 50 has been moved into a retracted position, that is, away from the core part 29. In this condition, plastic can be introduced into the mold cavity 100 in the manner described earlier.

After the plastic has been introduced into the mold cavity 100, the first, second and third movable wall parts 35A, B and 50 are moved to the forwardly moved positions. To that end, the slides 39 and wedges 52 are moved in the third direction T and the fifth direction K, respectively. Thereupon, the product 1 can solidify and be taken out of the mold 20 in the manner described earlier.

With such a mold, the introduction of the plastic is simplified still further and the pressure can be kept low, also if a thin bottom wall and/or particularly long flow paths are used. With it, also ribs and the like can be provided in a simpler manner.

In this embodiment, using the control unit 60, first the or each third movable wall part 50 is set into motion, next, in a second step, the or each first movable wall part 35A, and then, in a third step, the or each second movable wall part 35B. In this way, a particularly advantageous movement of the plastic through the mold cavity 100 is obtained. Since the plastic is introduced in relatively warm condition into a relatively large bottom-forming space 101, relatively little energy will be needed to spread the plastic through this space 101 and to force it into the wall-forming parts 102. Next, the plastic will be spread into the end wall-forming parts and eventually into the sidewall-forming parts. The second and third steps can start after the third movable wall part 60 has been brought into the forwardly moved position, but preferably at least the second step already begins before the or each third movable wall part has reached the forwardly moved position referred to. The third step preferably begins before the or each movable wall part 35A has reached the forwardly moved position.

A holder 1 according to the invention can also be manufactured, for instance, in a mold 20 according to FIGS. 8 and 9. This mold 20 is included in an injection molding apparatus, at least press, known per se, of which are shown parts of a fixed table D and a table C, movable relative thereto in a first direction of movement S. The mold 20 comprises a first part 21, arranged on the fixed table, and a second part 22, movable relative thereto, mounted on the movable table C. The first direction of movement S, of course, can have any orientation, for instance vertical as shown in FIGS. 8 and 9, but also horizontal, by tilting the press.

The second part 22 comprises a central core part 29, for forming the interior space 8 of the holder 1. This central core part 29 is surrounded on all sides at a distance D1 by a second core part 32 which is provided on the first part 21 of the mold 20. The distance D1 corresponds to the wall thickness D of the first wall 4 of the holder 1. The second core part 32 corresponds in shape to the shape of the cavity 6 in the longitudinal wall 3 of the holder 1. Optionally, pins 32A may be provided in the upper side of the second core part 32 which fit into recesses in the second part 22 of the mold 20, in support thereof. As a result, openings are formed in the edge 12. Between a forward end of the central core part 29 and the first part 22, a space 101 is provided for forming the bottom surface 2. In this space 101 terminates a supply opening 34A through which plastic can be introduced into the mold cavity 100.

On the side of the second core part 32 remote from the central core part 29, in the example shown on four sides, a first and second movable wall part 35A, B, respectively, are provided in the form of a slide which is movable in a direction of movement C. The surface 36 facing the second core part 32 has the shape of the outer side of the respective part of the longitudinal wall 3. Optionally, a projection 33 may be provided on the slide 35A for forming the handle 15, which projection, for that purpose, can reach through an opening in the second core part 32. For simplicity, projection 33 and associated opening have been drawn only on the right-hand side.

In the position shown in FIG. 8, the slides 35A, B are shown in a retracted position, that is, at a distance D2 from the second core part 32 that is greater than the desired wall thickness D3 of the second wall 5. Accordingly, between the slide 35A, B and the adjacent core part 32, a relatively large, wide space 102 is provided, through which plastic can flow readily and without much resistance.

Provided on the rear side of the slide 35A, B are inclined surfaces 37, in the embodiment shown two surfaces 37 which are inclined in opposite directions. Furthermore, a flat running surface 40 is provided behind the slide, that is, on the side thereof remote from the second core part 32. Provided between the inclined surfaces 37 and the running surface 40 are wedges 39 with correspondingly inclined surfaces 38 and running surfaces. The wedges 39 are connected with drive means 44, in FIGS. 8 and 9 constructed as piston-cylinder assemblies 47, with which the wedges 39 can be moved from the first position shown in FIG. 8 to a second position shown in FIG. 9 and vice versa. Through movement of the wedges 39 to the second position, the slides 35A, B are moved inwards, that is, towards the second core part 32. As a result, the space 102 is reduced and hence plastic present therein is displaced and/or slightly compressed.

In top plan view, a mold 20 according to FIGS. 8 and 9 is comparable to that in FIG. 6, in the sense that a pair of first movable wall parts 35A are provided along the short end sides of the mold cavity 100 and a pair of second movable wall parts 35B along the long sides of the mold cavity.

A mold 20 with press can be used as follows.

The mold 20 is brought into the closed position shown in FIGS. 8 and 9 and held closed by the press with a relatively light closing pressure. The closing pressure is lower than is necessary for injection molding a similar holder using conventional injection molding technique and injection mold, which can conventionally be determined from, basically, the projected surface in the direction S, the flow paths, in particular the wall thicknesses, and the plastic used.

The slides 35A, 35B are brought into the retracted, first position, whereupon, using means suitable therefor, plastic is introduced via the or each supply opening 34A into the space 101, preferably in molten, at least substantially fluid form. From the space 101, the plastic flows via the spaces between the central core part 29 and the second core part 32 over the second core part 32 into the spaces 102. Since the plastic experiences substantially no resistance in the spaces 102, it can easily flow into them without undesired pressure build-up and/or solidification of the plastic. Next, when substantially all necessary plastic has been introduced into the mold cavity 100, the drive means 44 are energized using a control unit 60. As a result, the wedges 39 are moved to the second position and the slides 35A, B are forced in the direction of the second core part 32. As a result, the plastic is forced further into the mold cavity 100, in particular up to the end of the space 102, so as to fill it completely.

The control unit 60 is then set such that the slides 39, at least the first and second wall parts 35A, B, are not moved all at the same time. In a first step, the first wall parts 35A for the end walls 4, 5 are moved, and next, in a second step, the third movable wall parts for the sidewalls 3. As a result, the available energy is utilized in a suitable manner, and the plastic can moreover be set into motion and kept moving better. In general, preferably, in each case, first the or each movable wall part having a relatively small surface is set into motion and only then a part having a larger surface. The first and second steps can be carried out such that the second step does not begin until the first step has been carried out completely, which means that the first movable wall parts 35A have been moved into the forwardly moved position completely. However, it is preferred that the second step is started sooner, that is, the second movable wall parts 35A are set into motion while the first movable wall parts 35A are still moving. In this way, a still better spread of the plastic can be obtained.

As the direction of movement C includes an angle with the direction of movement S, a favorable loading of the different parts is obtained. Since the plastic can flow into and through the mold cavity 32 without much resistance, relatively low pressures will suffice. This prevents, for instance, bending of the second core parts 27 and counteracts excessive wear. Moreover, partly as a result of this, the required closing force can be kept low.

After the slides have been moved forwards to a maximum, the plastic can solidify and, after optionally retracting the slides, and after opening the mold 20, the holder 1 can be taken out. As a result of the relatively low injection pressure, the product will be virtually stressless.

In FIGS. 8 and 9 the openings for forming the partition walls 10 are omitted for clarity.

The slides 35 of a mold 20 can be moved so fast that adiabatic heat development occurs in the plastic. As a result, the flow properties of the plastic can be further improved and any plastic which has solidified can be liquefied again. Alternatively, the slides 34 can also move slowly, so that the plastic is not heated, or is heated only to a very limited extent, and already solidifies to some extent during introduction. Also, it may be elected to move the slides in the direction of the second position (FIG. 9) already during introduction of the plastic, so that the plastic is kept moving continuously. This can be advantageous in particular with, for instance, crystalline plastics and plastics having a glass transition point and/or a low melt, or when product properties of the plastic are to be carefully preserved.

FIG. 10 shows a diagram of an apparatus 70 for control and operation of at least a number of the operating means 44 for the movable wall parts 35A, B and 50. This apparatus 70 comprises a pressure device 61, for instance a pump and/or accumulator, which communicates via a line system 62 with the different operating means 44, in particular the piston-cylinder assemblies 47. Between each piston-cylinder assembly and the pressure device extends a supply line 63 and a discharge line 64. Each of the lines 63, 64 includes a valve 65, 66. A control unit 60 is connected with the pressure device 61 and the valves 65, 66. Before a respective wall part 35A, B or 50 is to be moved, at least the valves 65 in the supply lines are closed and using the pressure device pressure is built up in the section of the line 63 extending between the pressure device and the respective valve 65. When this pressure is sufficiently high, for instance at a maximum, the valve 65 is controlled to open instantaneously, while the valve 66 in the discharge line 64 has been or is opened. As a result, the piston of the respective piston-cylinder assembly 47 will be moved instantaneously with very high speed, thereby operating the movable wall part 35A, B, 50. Next, using the discharge line, the piston is returned to the initial position and the valves are closed. The valves 65, 66, in particular the valves 65 in the supply lines, are arranged as closely as possible to the respective piston-cylinder assembly 44, so that the line section 63A between the valve 65 and the respective piston-cylinder assembly 44 is shorter than the section between the valve 65 and the pressure device, and preferably as short as possible. Surprisingly, it has been found that in this way the drive of the respective movable wall parts 35A, B and 50 is possible still more accurately. Without wishing to be bound to any theory, this seems to be the result of the mass inertia of the fluid in the lines. By placing the greater part of the lines under a relatively high working pressure, only a small part of the fluid needs to be set into motion and/or placed under pressure after the valves 65, 66 are opened, so that a much quicker response has been found possible. Moreover, in this way, the advantage is achieved that the movable wall parts can be driven more accurately. Preferably, for mutually associated movable wall parts, such as the pair of parts 35A or the pair of parts 35B, the line section 63A between the respective piston-cylinder assembly and the associated valve is made of corresponding design in each case, such that a substantially equal amount of fluid is present in them. Thus, the accuracy is influenced still further. Using for instance PLCs, the valves can be set and driven in a particularly accurate manner.

FIG. 11 shows an alternative embodiment, in which a double-acting piston 47A is provided. Supply line 63 and discharge line 64 terminate on opposite sides of the piston 47A. The control device is set such that prior to operation of a movable wall part 35, 50, on both sides of the piston the same high pressure prevails in the fluid, at least such pressures that the piston remains in a preselected position. When the respective wall part 35, 50 is to be moved to the forwardly moved position, the valve 66 in the discharge line 64 is opened, so that the pressure on that side of the piston 47A falls out and the piston is forced in that direction with force and high speed. In this way, in a particularly simple and accurate manner, the piston and hence the respective movable wall part 35, 50 can be moved.

It will be clear that each of the apparatuses 70 as shown in FIGS. 10 and 11 can be used with each of the molds 20 and methods as described earlier. Such apparatuses 70 can also be used for other moving parts in molds, whether or not according to the invention.

The invention is not limited in any way to the embodiments shown and described in the description and drawing. Many variations thereon are possible within the framework of the invention as outlined by the claims.

For instance, a plurality of mold cavities may be included within a mold according to the invention, both next to and above each other, for instance on opposite sides of the bottom plate. The first and second mold part can be interchanged, so that injection proceeds through or along the core part 29. In-mold labels, inserts and the like can be used in a mold according to the invention. The mold cavity can have any desired shape. It will be clear that any desired number of first, second and/or third movable wall parts can be used, depending on the products to be formed. A product formed with a mold or method according to the invention can for instance have a fully closed bottom, single-walled sidewalls or parts thereof, a different compartmentation or none, and the like. Other operating means may be provided for moving the slides and wedges, for instance electric or pneumatic mechanical lever systems, linkages and the like. Optionally, the energy of injection of the plastic can be used at least partly for moving one or more movable wall parts, for instance to a retracted position. What is shown is a continuous wall of the product 1. However, individual, mutually separated wall parts can naturally be used as well. The or each fixed wall part can be shaped and/or placed differently and can for instance carry the first movable wall parts on their sides.

In the embodiments shown, the operating means 40 are included in the second mold part. However, it is naturally also possible to include them at least partly in the plate D of the press. The second part 22 of the mold can then comprise the shafts 45. In this way, a universal tool can be manufactured on which in each case a different mold 20 can be placed which can be made of particularly simple and light design since the relatively heavy and costly parts of the operating means 44 can be used again and again.

It will be clear that the directions of movement can also be chosen differently than shown. Thus, for instance, the slide 39 can be made to be movable parallel to the first direction S, with adaptation of the operating surfaces 37, 38, at least the angle thereof with respect to the direction S. Also, in principle, the operating means 44 for the movable wall parts 35 can be included in the first mold part 21, with adaptation of the operating surfaces 37, 38, such that the slide 39 is moved in the direction of the second part 22 for moving the second movable wall part 35 to the forwardly moved position. Many variations thereof are possible and will be immediately clear from the description and drawings to those skilled in the art.

These and many comparable embodiments are understood to fall within the invention.

The invention claimed is:

1. A mold for forming products, provided with at least one mold cavity, which mold cavity is at least partly defined by at least one first and at least one second movable wall part and first and second drive means for respectively driving the first and second movable wall parts between a retracted position and a forwardly moved position, wherein a control unit is provided with which the drive means can be controlled, such that in a first step the or each first movable wall part is set into motion in the direction of a forwardly moved position and in a second step the or each second movable wall part is set into motion in the direction of a forwardly moved position, and wherein the first and second movable wall parts are movable independently of each other at different stages in the molding process.

2. A mold according to claim 1, wherein at least one third movable wall part is provided, wherein the control unit is arranged for setting the or each third movable wall part into motion in a third step.

3. A mold according to claim 1, wherein the or each first movable wall part has a first direction of movement and the or each second movable wall part has a second direction of movement, which first and second direction of movement mutually include an angle that deviates from 180 degrees.

4. A mold according to claim 2, wherein the or each third movable wall part has a third direction of movement which includes an angle with the first and second direction of movement, which angle deviates from 180 degrees.

5. A mold according to claim 2, wherein the mold cavity is arranged for forming products having a bottom and a wall and for that purpose comprises a bottom-forming part and a wall-forming part, wherein the or each first movable wall part is provided in the bottom-forming part and the or each second movable wall part and the or each third movable wall part are provided in the wall-forming part.

6. A mold according to claim 3, wherein the mold comprises at least a first and second mold part which are movable relative to each other in an opening and closing direction, wherein at least one of the movable wall parts has a direction of movement between the retracted position and the forwardly moved position that includes an angle with the opening and closing direction, which angle is 90 degrees.

* * * * *